US006195494B1

United States Patent
Abbott et al.

(10) Patent No.: US 6,195,494 B1
(45) Date of Patent: Feb. 27, 2001

(54) CABLE CONTROL APPARATUS FOR LIMITING THE MOVEMENT OF OPTICAL FIBERS

(75) Inventors: George G. Abbott, Richardson; George H. BuAbbud, South Lake, both of TX (US)

(73) Assignee: Marconi Communications, Inc., Cleveland, OH (US)

(*) Notice: Subject to any disclaimer, the term of this patent is extended or adjusted under 35 U.S.C. 154(b) by 0 days.

(21) Appl. No.: 09/411,024

(22) Filed: Oct. 4, 1999

(51) Int. Cl.[7] .................................................. G02B 6/00
(52) U.S. Cl. ............................................ 385/134; 385/135
(58) Field of Search .................................... 385/134–139, 385/56, 76, 87, 100, 101, 105, 112, 113, 114

(56) References Cited

U.S. PATENT DOCUMENTS

| 5,734,776 | * | 3/1998 | Puetz ........................................ 385/134 |
| 5,758,003 | * | 5/1998 | Wheeler et al. .......................... 385/134 |

* cited by examiner

*Primary Examiner*—Phan T. H. Palmer
(74) *Attorney, Agent, or Firm*—Jones, Day, Reavis & Pogue

(57) ABSTRACT

Apparatus and methods for controlling the movement of optical fiber cables wherein said apparatus includes a cam plate which defines a pair of cam tracks. A pair of cam followers is also provided such that the cam plate moves with respect to the cam followers from a first location to a second location, and in such a manner that both the extent of the movement and the direction of movement of the structure and an attached optical fiber are controlled.

8 Claims, 3 Drawing Sheets

CABLE CONTROL APPARATUS FOR LIMITING THE MOVEMENT OF OPTICAL FIBERS

BACKGROUND OF THE INVENTION

1. FIELD OF THE INVENTION

The present invention relates to optical fiber communication apparatus and more specifically, to apparatus for limiting the movement of optical cables so as to avoid damage during connecting and disconnecting the cables in space-restricted areas.

The telecommunications industry is using more and more optical or light fibers in lieu of copper wire. Optical fibers have an extremely high band width, thereby allowing significantly more information than can be carried by a copper wire. However, optical fibers also require more careful handling and attention during use to avoid damage or unsatisfactory operation. For example, even the most robust optical fibers must not be bent or coiled with a too small radius to avoid degradation of the transmission qualities of the optical fiber. Transmission degradation can occur if the optical fiber is coiled or bent in a tight loop even though there is no physical damage done to the optical fiber or cable.

Therefore, it is important to control the bends and coils that a fiber-optic is subjected to during installation and subsequent maintenance operations.

SUMMARY OF THE INVENTION

It is an object of this invention to provide simple and inexpensive equipment to help control coil size and limit the bend radius experienced by an optical fiber during installation and maintenance.

It is a further object of this invention to provide equipment which operates in conjunction with existing equipment and which provides support for optical fibers during connecting and disconnecting of the fibers.

The present invention accomplishes these and other objects by providing apparatus for controlling the movement of the optical cables during installation or maintenance operations. The apparatus comprises at least one cable, such as an optical cable, and a support structure which is associated with the cable. An attachment member is selectively supported by the support structure at a first location, and the attachment member is movable between the first location and a second location. The fiber-optic cable is secured to the attachment member. A cam plate is also secured to the attachment member and the cam plate defines a pair of cam tracks. A pair of cam followers or pins are supported in a fixed position with respect to the support structure and the cam followers are received in the cam tracks such that the movement of the attached member and the attached cable is controlled by movement of the cam followers in the cam tracks. Thus, it is seen that the movement of the attachment member is limited by the extent that the cam followers are allowed to travel relative to the cam tracks.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

Figure 1:
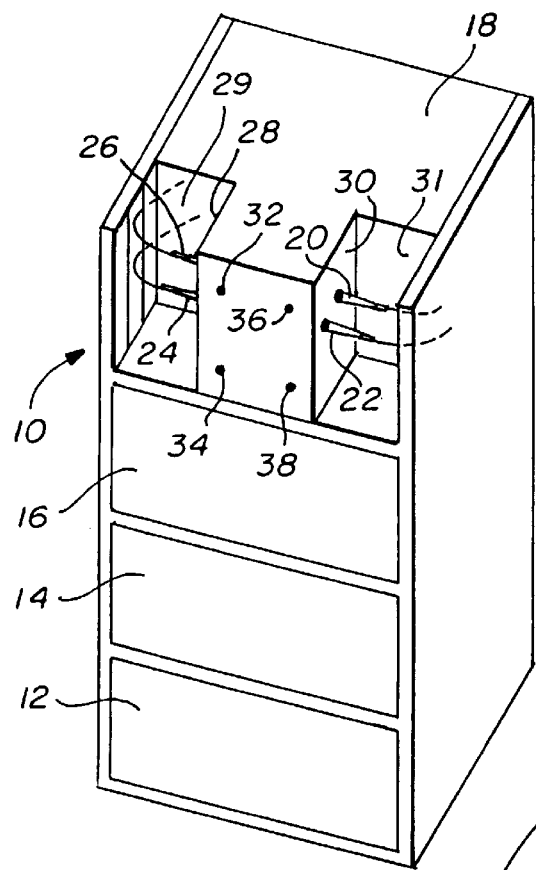
FIG. 1 is a perspective view of the apparatus of this invention mounted in a fiber-optic distribution cabinet.

Referring now to FIG. 1, there is shown generally at 10 a perspective view of a fiber-optical distribution cabinet having several panels such as panels 12, 1,4, and 16, along with a fiber-optical panel having cable-limiting motion according to the teachings of the present invention shown as panel 18. As shown and as will be discussed in more detail hereinafter, according to one embodiment of the present invention, the fiber-optical panel 18 includes two recessed areas for protecting the optical fiber connectors to panel 18. As shown, four optical fiber connectors (20, 22, 24, and 26) having optical fibers attached thereto are connected to the side panels 28 and 30 in the recesses 29 an 31 of panel 18. Also shown are four quick-disconnect screws or members (32, 34, 36, and 38) which, as will become clear later, hold the side panels 28 and 30 in position for normal operation. Further, as will be appreciated by those skilled in the art, although the present invention is particularly applicable to panels having optical fiber cable connectors, it can also, of course, be used with any type of delicate or fragile wires or connectors that may be damaged by experiencing excessive tension or short radius bends or loops.

Figure 3:
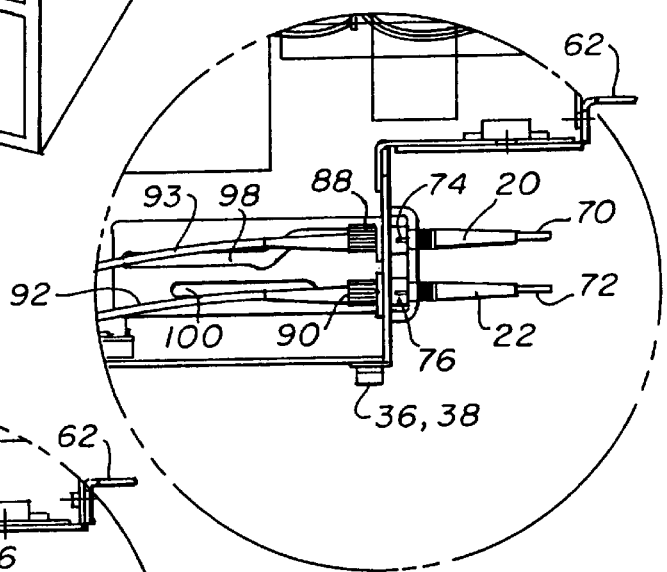
FIGS. 3–7 illustrate movement of an optical-fiber connection panel between a closed position and a fully extended position according to the teachings or this invention.
Figure 2:
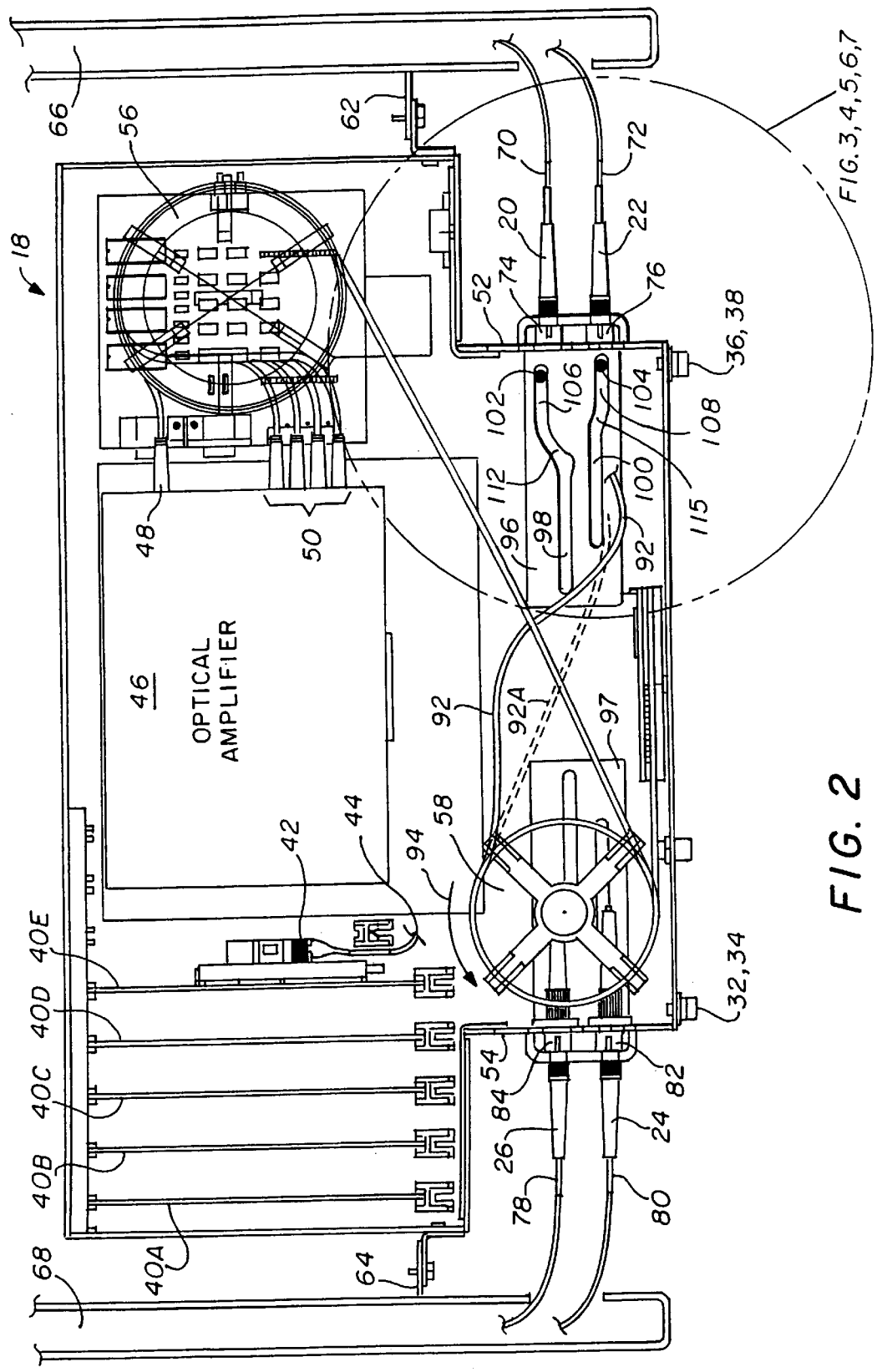
FIG. 2 is a top view of the optical-fiber panel of FIG. 1 showing the cable control apparatus of this invention.

Referring now to FIG. 2 and FIG. 3, there is shown a top view of panel 18, which illustrates the apparatus of this invention. As shown, a support structure such as panel 18 may contain a number of printed circuit boards, such as boards 40A–40E. As can be seen, there is a fiber-optical connector 42 attached to optical fiber 44, which is mounted to one of the printed circuit boards, such as board 40E. There is also shown amplifier circuitry 46 having a single input optical fiber 48 and four optical outputs indicated by reference number 50. In the particular embodiment shown, the four optical outputs are connected to optical fiber cables which terminate two each at side panels 28 and 30 by means of attachment members 52 and 54. It should be noted at this point that the routing of the optical fiber cables between the outputs 50 and the attachment members 52 and 54 is simplified for purposes of explanation but, as shown in the embodiment of FIG. 2, are coiled around a first spool area 56, having a minimum diameter such that the transmission qualities of the fiber optics will not be degradated. The optical fiber then travels from the spool 56 to a pair of spools 58 and 60 (not shown), which also have a diameter that is large enough to prevent degradation of the transmission quantities of the fiber optics. Spool 60 has not been included to avoid difficulty in reviewing and understanding the drawings. If spool 50 had been included, it would be located over cam plate 96 in the same manner spool 58 is located over cam plate 97. Shown for illustration purposes only and to help the understanding of the present invention, it is seen that the panel 18 is mounted by brackets 62 and 64 to the edges 66 and 68, respectively, of cabinet 10. It is also seen that a pair of cables 70 and 72 terminate at connectors 20 and 22, respectively, and are, in turn, connected to bulkhead connectors 74 and 76 which are mounted to attachment member 52 of side panel 30. Likewise, cables 78 and 80 terminate at optical connectors 24 and 26 which connectors are, in turn, connected to bulkhead connectors 82 and 84 which are mounted to attachment member 54. As was discussed earlier with respect to FIG. 1, the optical fiber connectors 20, 22, 24, and 26 are somewhat delicate and must be protected from sharp or small radius bends in the same manner the optical fibers 70, 72, 78, and 80 are protected. It is also important to avoid excessive tension on the cables since, if a loop of the cable exists and is subjected to tension, the radius of the loop will likely be reduced below a satisfactory level. The arrangement of the cables coming from the side areas 66 and 68 of cabinet 10 to the side attachment members 52 and 54 helps prevent such excessive small radius loops. It will be readily appreciated, that, for example, the optical fibers 70 and 72 and their respective connectors 20 and 22 will be protected from unintentional forces and are protected from impact in a much superior manner than they would be if mounted on the front face 82 of panel 18.

However, it will be appreciated that if side panels or attachment members 52 and 54 on side panels 30 and 28, respectively, were simply rigidly fixed panels at the side of panel 18, they would create their own shortcomings. Therefore, panels 52 and 54 include the novel and inventive apparatus and methods of the present invention. For example, as shown, side panel 30 or attachment member 52 includes bulkhead optical fiber connectors 74 and 76, such that optical fibers can be mounted to the connector on both sides of attachment member 52. Thus, in the embodiment shown, fiber-optical connectors 20 and 22 are connected to bulkhead connectors 74 and 76, respectively, while at the same time fiber-optical connectors 88 and 90 (see FIG. 3) connect to the back side of bulkhead connectors 74 and 76. An optical fiber is, of course, attached to each of the connectors 88 and 90. For example, optical fibers 92 and 93 are shown connected to side panel 52 at connectors 88 and 90. In the embodiment shown, it is seen that the optical fiber cable 92 is routed around spool 58 and then to spool 56 before being connected to one of the outputs 50. It is also seen that optical fiber cable 92 is of an excessive length for purposes as will be discussed later. However, it is important to notice that there is not a full loop of optical fiber cable 92, thereby avoiding the possibility of tight kinks or short radius loops. In another embodiment, rather than having an excessive amount of loose fiber-optic cable as discussed above, the spool or reel 58 is biased to rotate in the direction shown by arrow 94 to keep the fiber-optic cable wound around reel 58 as indicated by the straight dotted lines 92A. Although biased in the direction indicated by arrow at 94, it will be appreciated that spool 58 must be allowed to rotate in the direction opposite arrow 94 to allow side panel or attachment member 52, with the cables attached, to be moved away from panel 18. Therefore, it will be appreciated that spool 58 will have a limited amount of travel in a clockwise direction of between about 90° and 180°.

As shown, a cam plate 96 is secured to side panel or attachment member 52 on side panel 30. Also as shown, cam plate 96 defines two cam tracks (98 and 100), which have a shape that controls the amount and direction of movement of side panel or attachment member 52. In each cam track 98 and 100, there is located cam followers 102 and 104, respectively, which are rigidly secured to panel 18 such that, when the attachment member 52 is pulled away from panel 18 as discussed above, the amount of movement away from and the direction of movement is controlled.

Figure 4:
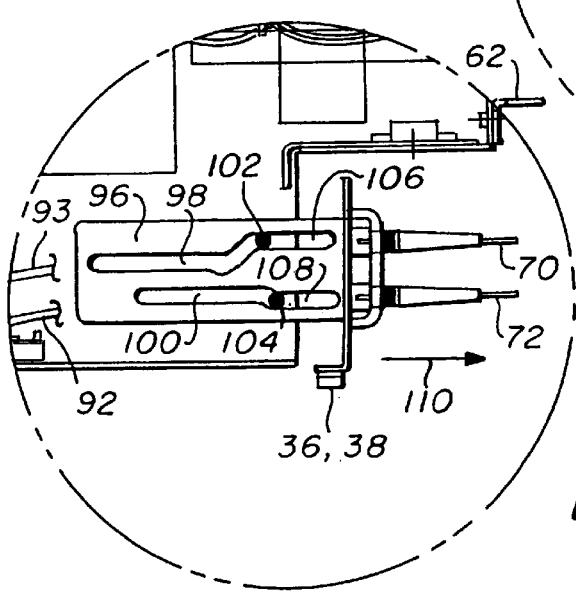

Referring now to FIGS. 3–7, there is shown the movement of side panel or attachment member 52 with the optical fiber cables 70 and 72 attached on the outside face of attachment member 52 and cable 92 attached to connector 90 on the inside face of attachment member 52. As shown in FIG. 3, the position of the attachment member 52 is the same as was discussed with respect to FIG. 2 above and the attachment member 52 is secured in position for normal operation by quick-disconnect members or screws 36 and 38. However, in FIG. 2 and FIGS. 4–7, the optical connectors 88 and 90 and optical fiber 92 are not shown so that the cam tracks 98 and 100 are clearly visible. FIG. 3, however, shows fibers 92 and 93 as well as connectors 88 and 90, even though the cam tracks 98 and 100 are obscured. Referring to FIG. 4, there is shown the first allowable movement of attachment member 52. It will be appreciated by those skilled in the art, maintenance of fiberoptical cables often requires the interface between the cable and the bulkhead connector to be cleaned. This is because anytime the optical fiber cable connectors are exposed, it is possible for dirt to be admitted and, when reconnected, the efficiency of the fiber-optical transmission will suffer. As shown in FIGS. 2 and 4, the initial portions 106 and 108 of cam tracks 98 and 100, respectively, are parallel to each other and extend perpendicular to the inside face of attaching member 52. Thus, the initial movement allowed by the cam tracks of attaching member 52 away from 18 is directly away from panel 18 as shown by arrow 110 in FIG. 4.

Figure 5:
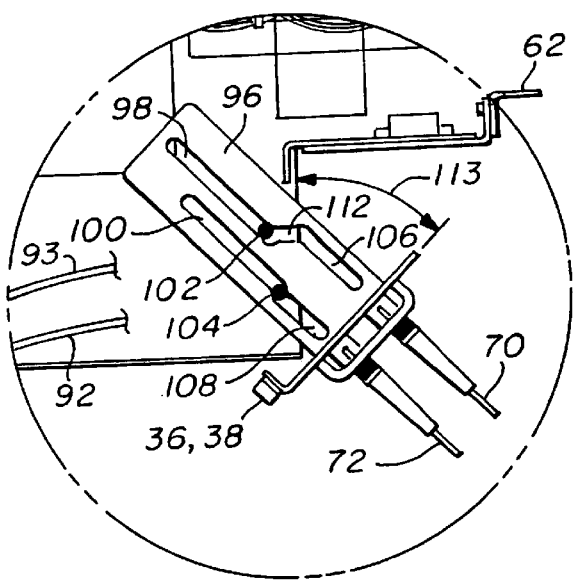

After the first movement of attachment member 52, it is seen in FIG. 5 that no further movement is allowed except for rotational movement due to the curved portion 112 of cam track 98 and the abrupt stop or direction change of cam track 100. Thus, the cam followers 102 and 104 only allow the rotational movement as indicated by double-headed arrow 113 in FIG. 5. The rotation of the attachment member continues until the full length of the curved portion 112 of the path 98 is traversed and no further rotational motion is possible.

Figure 6:
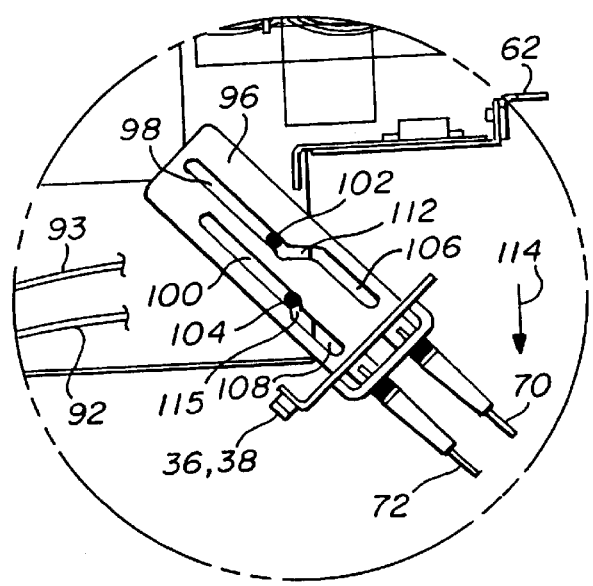

Referring now to FIG. 6, it is seen that the small path segment 115 of track 100 requires the next motion of the attachment member 52 to be a slight motion towards the front of the panel 18 as indicated by arrow 114. Once the cam plate 96 has made the small movement allowed by path segment 115 of cam track 100 as illustrated in FIG. 6, the remaining length of both cam tracks 98 and 100 is parallel to each other and allows the final full extension of the attachment member 52 at approximately a 45° angle away from the edge 66 of the cabinet 10.

Figure 7:
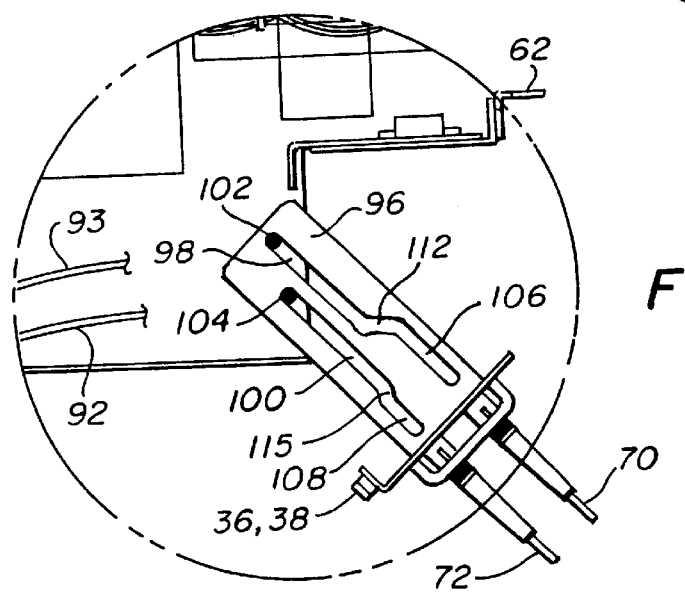

FIG. 7 shows the attachment member 52 in its fully extended position with the cam follower pins 102 and 104 at the end points of cam tracks 98 and 100, respectively. Thus, it will be appreciated that the direction of movement and the degree of movement have been controlled by the cam tracks and the cam followers according to the teachings of the present invention. Also, it will be appreciated that in this fully extended position, the fiber-optical cables connected to both sides of the bulkhead optical connectors 74 and 76 are easily accessed for maintenance purposes.

The corresponding structures, materials, acts, and equivalents of all means or step plus function elements in the claims below are intended to include any structure, material, or act for performing the function in combination with other claimed elements as specifically claimed.

What is claimed is:

1. Apparatus for controlling the movement of cables attached to a panel comprising:

a support structure associated with said cables;

an attachment member selectively supported by said support structure at a first location, and movable between said first location and a second location, at least one of said cables secured to said attachment member;

a cam plate secured to said attachment member, said cam plate defining a pair of cam tracks, each having a selected path shape and a selected length of path; and a pair of cam followers supported in a fixed position with respect to said support structure, said cam followers being received by said cam tracks such that the direction of movement and the amount of movement of said attachment member and said at least one cable is controlled by movement of said cam followers in said cam tracks.

2. The apparatus of claim 1 wherein said at least one cable comprises more than one cable.

3. The apparatus of claim 1 wherein said at least one cable is an optical transmission fiber.

4. The apparatus of claim 1 and further comprising at least one securing member and wherein said attachment member is secured to said support structure by said at least one securing member.

5. The apparatus of claim 1 and further comprising an optical connector and wherein said at least one cable is secured to said attachment member by said optical connector.

6. The apparatus of claim 1 wherein said attachment member includes a bulkhead optical connector having an inside portion and an outside portion and said at least one cable is attached to said inside portion of said optical connector.

7. The apparatus of claim 1 wherein said cam tracks allow limited movement in a first direction and then allows movement in at least one second direction.

8. The apparatus of claim 7 wherein said cam tracks allow rotation of said attachment member upon completion of said first limited movement to allow said limited movement in said second direction.

* * * * *